United States Patent
Khoshnevisan et al.

(10) Patent No.: US 12,349,128 B2
(45) Date of Patent: Jul. 1, 2025

(54) INDICATING CAPABILITY FOR CODEBOOK BASED AND NON-CODEBOOK BASED PHYSICAL UPLINK SHARED CHANNEL (PUSCH) TRANSMISSIONS

(71) Applicant: QUALCOMM Incorporated, San Diego, CA (US)

(72) Inventors: Mostafa Khoshnevisan, San Diego, CA (US); Yitao Chen, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 299 days.

(21) Appl. No.: 17/657,512

(22) Filed: Mar. 31, 2022

(65) Prior Publication Data

US 2022/0322389 A1    Oct. 6, 2022

Related U.S. Application Data

(60) Provisional application No. 63/169,664, filed on Apr. 1, 2021.

(51) Int. Cl.
*H04W 72/1268* (2023.01)
*H04L 1/08* (2006.01)
(Continued)

(52) U.S. Cl.
CPC .......... *H04W 72/1268* (2013.01); *H04L 1/08* (2013.01); *H04L 5/0044* (2013.01);
(Continued)

(58) Field of Classification Search
CPC .......... H04W 72/1268; H04W 72/044; H04W 72/23; H04L 1/08; H04L 5/0051;
(Continued)

(56) References Cited

U.S. PATENT DOCUMENTS

| 2019/0174466 A1* | 6/2019 | Zhang | H04L 5/0057 |
| 2020/0053724 A1* | 2/2020 | MolavianJazi | H04W 72/21 |

(Continued)

FOREIGN PATENT DOCUMENTS

| EP | 4016910 A1 | 6/2022 |
| WO | 2021054726 A1 | 3/2021 |

OTHER PUBLICATIONS

International Search Report and Written Opinion—PCT/US2022/023074—ISA/EPO—Jul. 7, 2022.
(Continued)

*Primary Examiner* — Redentor Pasia
(74) *Attorney, Agent, or Firm* — Patterson+ Sheridan, L.L.P.

(57) ABSTRACT

Certain aspects of the present disclosure provide apparatus, methods, processing systems, and computer readable mediums for transmitting repetitions of uplink data (e.g., physical uplink shared channel (PUSCH)), in particular, for transmitting PUSCH repetitions in multiple transmission and reception points (multi-TRP) and/or multi-panel configurations. In a general aspect, the present disclosure provides techniques for signaling user equipment (UE) capability regarding codebook based and non-codebook based uplink transmissions in multi-TRP for improving reliability and robustness. For example, a UE may signal to a network entity an indication of a capability to support PUSCH transmission with at least two sets of repetitions. Each set of repetitions is associated with at least one sounding reference signal (SRS) resource set.

28 Claims, 10 Drawing Sheets

(51) Int. Cl.
*H04L 5/00* (2006.01)
*H04W 72/044* (2023.01)
*H04W 72/23* (2023.01)

(52) U.S. Cl.
CPC ......... *H04L 5/0051* (2013.01); *H04W 72/044* (2013.01); *H04W 72/23* (2023.01)

(58) Field of Classification Search
CPC ..... H04L 1/1864; H04L 5/001; H04L 5/0044; H04L 5/0094
See application file for complete search history.

(56) References Cited

U.S. PATENT DOCUMENTS

| | | | | |
|---|---|---|---|---|
| 2021/0184812 | A1* | 6/2021 | MolavianJazi | H04L 1/0041 |
| 2021/0314037 | A1* | 10/2021 | Rahman | H04L 25/0226 |
| 2022/0200736 | A1* | 6/2022 | Cirik | H04L 5/0051 |
| 2022/0303910 | A1* | 9/2022 | Zhang | H04L 5/0051 |
| 2022/0353042 | A1* | 11/2022 | Gao | H04W 16/28 |
| 2023/0023719 | A1* | 1/2023 | Ji | H04W 16/28 |
| 2023/0063015 | A1* | 3/2023 | Muruganathan | H04L 5/0091 |
| 2023/0076139 | A1* | 3/2023 | Muruganathan | H04L 5/0048 |
| 2023/0104029 | A1* | 4/2023 | Matsumura | H04B 7/0617 370/329 |
| 2023/0208592 | A1* | 6/2023 | MolavianJazi | H04L 1/0041 370/336 |
| 2023/0262692 | A1* | 8/2023 | Lin | H04W 72/566 370/329 |
| 2023/0344576 | A1* | 10/2023 | Lim | H04L 5/0094 |
| 2023/0388080 | A1* | 11/2023 | Hindy | H04L 5/0057 |
| 2024/0072965 | A1* | 2/2024 | Frenne | H04L 5/0023 |

OTHER PUBLICATIONS

Xiaomi: "Enhancements on Multi-TRP for PDCCH, PUCCH and PUSCH", 3GPP Draft, 3GPP TSG-RAN WG1 Meeting #104-e, R1-2101093, 3rd Generation Partnership Project (3GPP), Mobile Competence Centre, 650, Route Des Lucioles, F-06921 Sophia-Antipolis Cedex, France, vol. RAN WG1, No. e-Meeting, Jan. 25, 2021-Feb. 5, 2021, Jan. 18, 2021 (Jan. 18, 2021), XP051970665, 19 Pages, Retrieved from the Internet: URL: https://ftp.3gpp.org/tsg_ran/WG1_RL1/TSGR1_104-e/Docs/R1-2101093.zip [Retrieved on Jan. 18, 2021] Section 3, p. 5-p. 10.

* cited by examiner

INDICATING CAPABILITY FOR CODEBOOK BASED AND NON-CODEBOOK BASED PHYSICAL UPLINK SHARED CHANNEL (PUSCH) TRANSMISSIONS

CROSS-REFERENCE TO RELATED APPLICATION(S)

This application claims benefit of and priority to U.S. Provisional Application No. 63/169,664, filed Apr. 1, 2021, which is hereby assigned to the assignee hereof and hereby expressly incorporated by reference herein in its entirety as if fully set forth below and for all applicable purposes.

BACKGROUND

Field of the Disclosure

Aspects of the present disclosure relate to wireless communications, and more particularly, to techniques for indicating user equipment (UE) capability.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims, which follow, some features will now be discussed briefly. After considering this discussion, and particularly after reading the section entitled "Detailed Description" one will understand how the features of this disclosure provide advantages that include improved techniques for capability indication.

Certain aspects of the subject matter described in this disclosure can be implemented in a method for wireless communication by a user equipment (UE). The method generally includes signaling, to a network entity, an indication of a capability of the UE to support physical uplink shared channel (PUSCH) transmission with at least two sets of repetitions. Each set of repetitions is associated with at least one sounding reference signal (SRS) resource set. The method further includes receiving, from the network entity, a configuration of at least two SRS resource sets based on the indicated capability. The method includes transmitting an SRS on SRS resources within each of the at least two SRS resource sets associated with the at least two sets of repetitions. The method includes receiving, from the network entity, a downlink control information (DCI) scheduling PUSCH repetitions, the DCI indicating one or more SRS resources within the at least two SRS resource sets. The method further includes transmitting the PUSCH repetitions in the two sets of repetitions based on the SRS resources within the at least two SRS resource sets indicated in the DCI.

Certain aspects of the subject matter described in this disclosure can be implemented in a method for wireless communication by a network entity. The method generally includes receiving, from a user equipment (UE), an indication of a capability of the UE to support physical uplink shared channel (PUSCH) transmission with at least two sets of repetitions. Each set of repetitions is associated with at least one sounding reference signal (SRS) resource set. The method further includes transmitting, to the UE, a configuration of at least two SRS resource sets based on the indicated capability. The method includes receiving an SRS on SRS resources within each of the at least two SRS resource sets associated with the at least two sets of repetitions. The method includes transmitting to the UE a downlink control information (DCI) scheduling PUSCH repetitions, the DCI indicating one or more SRS resources within the at least two SRS resource sets. The method further includes receiving from the UE the PUSCH repetitions in the two sets of repetitions based on the SRS resources within the at least two SRS resource sets indicated in the DCI.

Aspects of the present disclosure provide means for, apparatus, processors, and computer-readable mediums for performing the methods described herein.

Aspects of the present disclosure provide means for, apparatus, processors, and computer-readable mediums for performing techniques and methods that may be complementary to the operations by the UE described herein, for example, by a BS.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
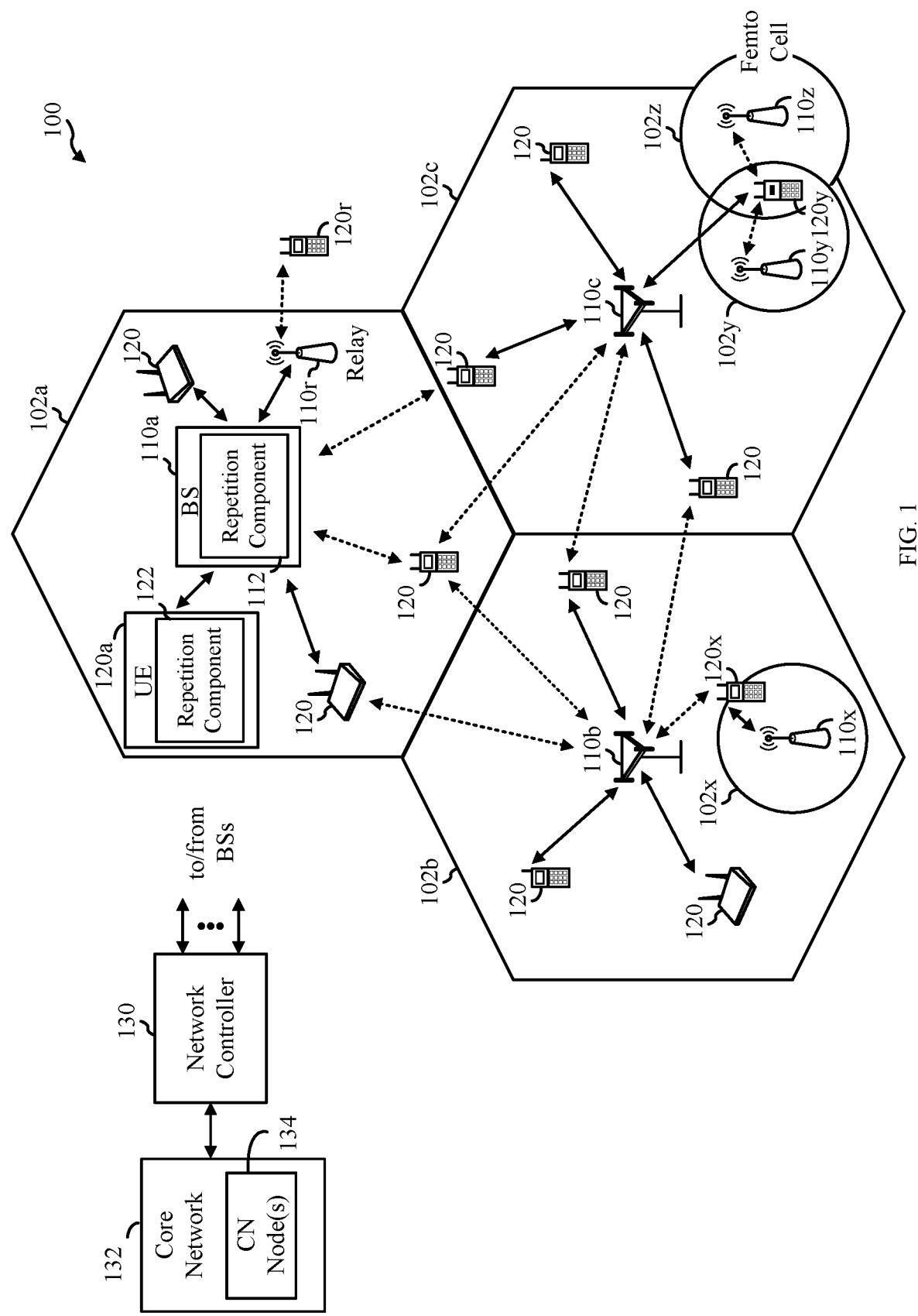
FIG. 1 is a block diagram conceptually illustrating an example telecommunications system, in accordance with certain aspects of the present disclosure.

Aspects of the present disclosure provide apparatus, methods, processing systems, and computer readable mediums for transmitting repetitions of uplink data (e.g., physical uplink shared channel (PUSCH)), for example, for transmitting PUSCH repetitions in multiple transmission and reception points (multi-TRP) and/or multi-panel configurations. In a general aspect, the present disclosure provides techniques for signaling user equipment (UE) capability regarding codebook based and non-codebook based uplink transmissions in multi-TRP for improving reliability and robustness.

For example, a UE may signal to a network entity an indication of a capability to support PUSCH transmission with at least two sets of repetitions. Each set of repetitions is associated with at least one sounding reference signal (SRS) resource set. The UE may receive from the network entity a configuration of at least two SRS resources sets based on the indicated capability, and transmit an SRS on SRS resources within each of the at least two SRS resource sets associated with the at least two sets of repetitions. The UE may receive, from the network entity, a downlink control information (DCI) scheduling PUSCH repetitions. The DCI indicates one or more SRS resources within the at least two SRS resources sets. The UE may transmit the PUSCH repetitions in the two sets of repetitions based on the SRS resources within the at least two SRS resource sets indicated in the DCI.

In multi-TRP situations, when different PUSCH repetitions are intended to be received at different TRPs/panels/antennas on the network side, different beams or power control parameters are required. In some cases, PUSCH repetitions may belong to two SRS resource sets, each SRS resource set having its own beam or power control parameters. For example, a downlink control information (DCI) scheduling the PUSCH may indicate two beams or two sets of power control parameters by indicating one or more SRS resources within each of the two SRS resource sets. The present disclosure provides techniques for extending such features in multi-TRP situations to codebook and non-codebook based uplink transmissions.

For example, in either codebook or non-codebook based uplink transmissions, the capability signaling can be extended for a number (e.g., a maximum number) of supported SRS resources across two or more SRS resource sets, as well as a number of supported SRS resources for each of the two or more SRS resource sets. In non-codebook based uplink transmissions, the capability signaling can be extended for the support of two or more associated CSI-RS resources for the two or more SRS resource sets. The indication may include a number of SRS resources associated with one CSI-RS resource, or a number of SRS resources associated with either one of the two or more CSI-RS resources. The indication may also include a number of ports per one associated CSI-RS resource, of a number of ports across both CSI-RS resource (e.g., per bandwidth part (BWP) or per component carrier (CC)).

The following description provides examples of capability indication in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method, which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, according to certain aspects, the BSs 110 and UEs 120 may be configured to support PUSCH repetitions. As shown in FIG. 1, the BS 110a includes a repetition component 112. The UE 120a includes a repetition component 122. The repetition component 112 and the repetition component 122 may be configured to indicate or receive indication of capabilities regarding codebook based and non-codebook based multi-TRP PUSCH (e.g., according to operations 600 and 700 described below with reference to FIGS. 6 and 7).

The wireless communication network 100 may be an NR system (e.g., a 5G NR network). As shown in FIG. 1, the wireless communication network 100 may be in communication with a core network 132. The core network 132 may in communication with one or more base station (BSs) 110 and/or user equipment (UE) 120 in the wireless communication network 100 via one or more interfaces.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell," which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. A network controller 130 may couple to a set of BSs 110 and provide coordination and control for these BSs 110 (e.g., via a backhaul).

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

According to certain aspects, the BSs 110 and UEs 120 may be configured for capability indication. As shown in FIG. 1, the BS 110a includes a repetition component 112. The repetition component 112 may be configured to receive from a UE an indication of a capability for PUSCH transmission with at least two sets of repetitions (e.g., when each set of repetitions is associated with an SRS resource set in multi-TRP scenarios). As shown in FIG. 1, the UE 120a includes a repetition component 122. The repetition component 122 may be configured to implement one or more techniques described herein for indicating a capability to support PUSCH transmission with at least two sets of repetitions, in accordance with aspects of the present disclosure.

While BSs 102 are depicted in various aspects as unitary communications devices, BSs 102 may be implemented in various configurations. For example, one or more components of base station may be disaggregated, including a central unit (CU), one or more distributed units (DUs), one or more radio units (RUs), a Near-Real Time (Near-RT) RAN Intelligent Controller (MC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture.

Figure 2:
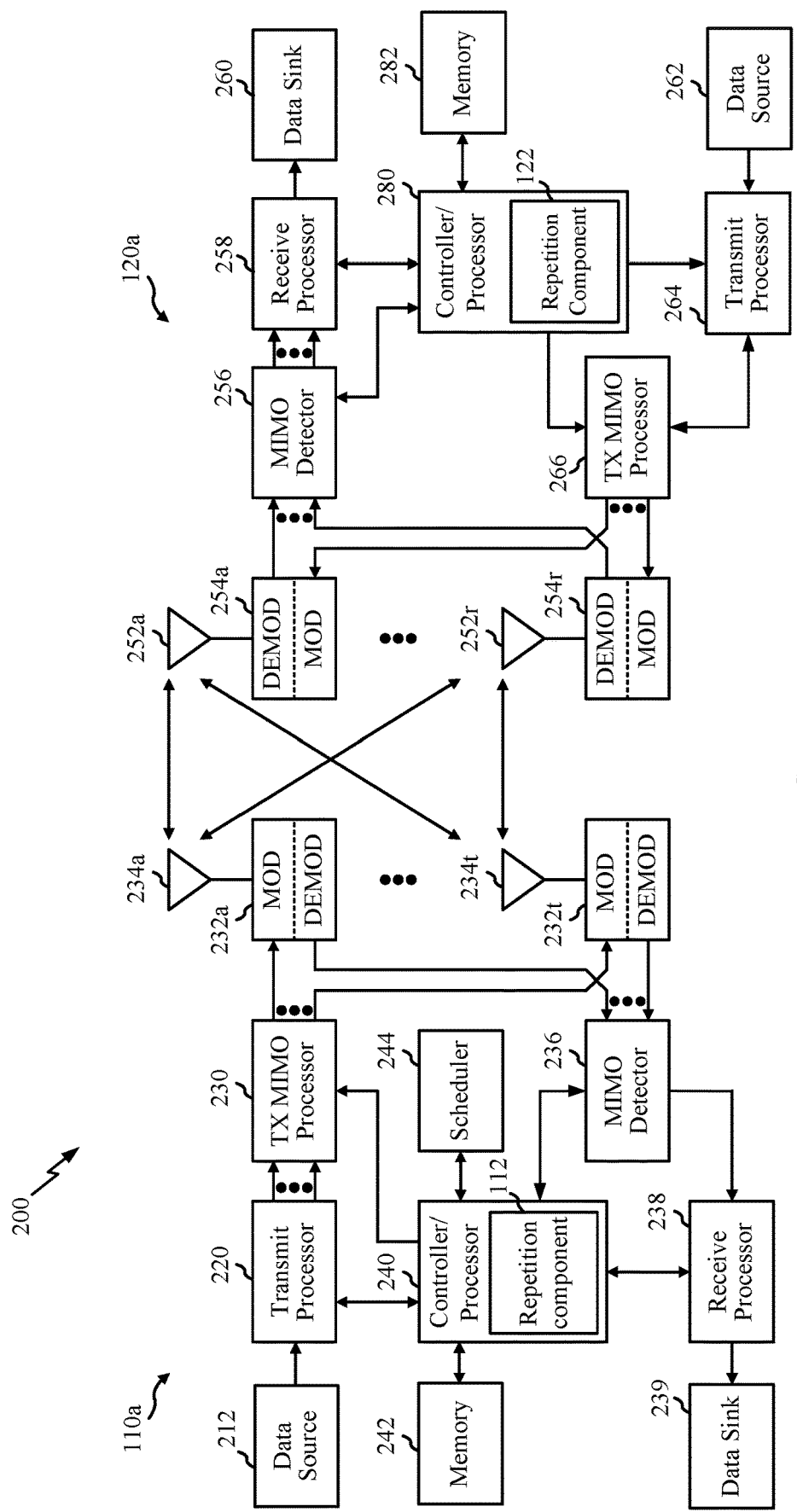
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators in transceivers 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators (MODs) in transceivers 254a-254r (e.g., for SC-FDM, etc.), and transmitted to the BS 110a. At the BS 110a, the uplink signals from the UE 120a may be received by the antennas 234, processed by the modulators in transceivers 232a-232t, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 240 of the BS 110a has (may be used to implement) a repetition component 112 that may be configured to perform one or more techniques described herein. As shown in FIG. 2, the controller/processor 280 of the UE 120a has (may be used to implement) a repetition component 122 that may be configured to perform one or more techniques described herein. Although shown at the controller/processor, other components of the UE 120a and BS 110a may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
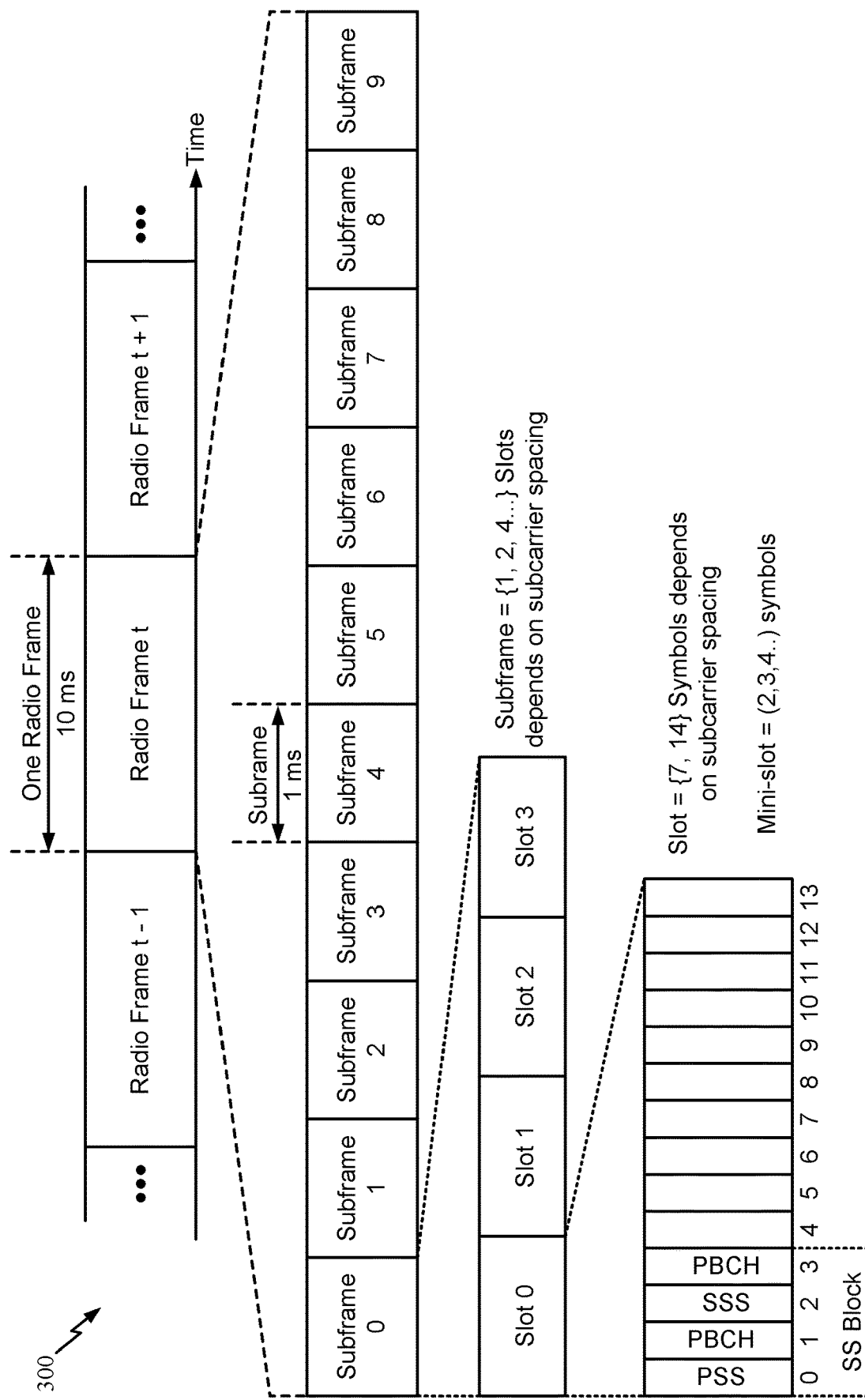
FIG. 3 is an example frame format for new radio (NR), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7 or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, invalid, or flexible) for data transmission and the link direction for each subframe may be dynamically switched. The link directions may be based on the slot format. Each slot may include DL/UL data as well as DL/UL control information.

Example PUSCH Transmission with Repetition

To improve data transmission reliability, it may be desirable to repeat data transmissions between a transmitting device and a receiving device. Such repeated data transmissions can improve the likelihood that the receiver receives at least one correct version of the data (and may allow for soft combining of information from different repetitions). This may be particularly useful in noisy radio environments or where channel conditions are poor.

In some cases, repetitions of transmissions of PUSCH may be supported. For example, in Release 16, two types of PUSCH repetitions are defined: PUSCH repetition Type A and PUSCH repetition Type B (discussed below). These two types of PUSCH repetitions may be applicable to uplink configured grant (CG) transmission and/or uplink dynamic grant (DG) transmission. With PUSCH repetition Type A, each repetition of PUSCH generally occurs over one or more symbols within a given slot. However, with PUSCH repetition Type B, a given repetition of PUSCH may occur over one or more symbols that cross a slot boundary.

In addition, two types of PUSCH transmissions, codebook and non-codebook based PUSCH transmissions, are supported in Release 15 or 16. In codebook based transmission, a UE may be configured with one SRS resource set with "usage" set to "codebook." The UE may be configured with a maximum number of four SRS resources within the SRS resource set. Each SRS resource is RRC-configured with a number of ports (nrofSRS-Ports). The SRS resource indicator (SRI) field in the uplink (UL) DCI (scheduling PUSCH) indicates one SRS resource. The number of ports configured for the indicated SRS resource determines the number of antenna ports for PUSCH. The PUSCH is transmitted with the same spatial domain filter (i.e., UL beam) as the indicated SRS resources. The number of layers (rank) and TPMI (precoder) for the scheduled PUSCH can be determined from a separate DCI field (e.g., "Precoding information and number of layers").

In non-codebook based transmission, a UE can be configured with one SRS resource set with "usage" set to "noncodebook." Similar to the codebook based situation, the UE may be configured with a maximum number of four SRS resources within the SRS resource set. The UE may be configured with a maximum number of four SRS resources within the SRS resource set. Each SRS resource has one port. The SRI field in the UL DCI (scheduling PUSCH) indicates one or multiple SRS resources. The number of indicated SRS resources determines the rank (i.e. number of layers) for the scheduled PUSCH. The PUSCH is transmitted with the same precoder as well as spatial domain filter (i.e., beam) as the indicated SRS resources (indicated by the SRI). The SRS resource set can optionally be configured with one associated NZP CSI-RS resource (by RRC parameter associated with CSI-RS). The UE may calculate the precoder used for the transmission of SRS resources within the set based on measurement of the associated NZP CSI-RS resource.

PUSCH repetition Type A may have a similar design to PUSCH defined in Release 15. For example, one PUSCH transmission instance is not allowed to cross the slot boundary for both DG and CG PUSCH. To avoid transmitting a long PUSCH across slot boundary, the UE can transmit small PUSCHs in several repetitions scheduled by an UL grant or RRC in the consecutive available slots. If the number of repetitions K>1, the same start and length indicator (SLIV) (where SLIV indicates the start symbol and length of PUSCH) is applied across the K consecutive slots.

Figure 4:
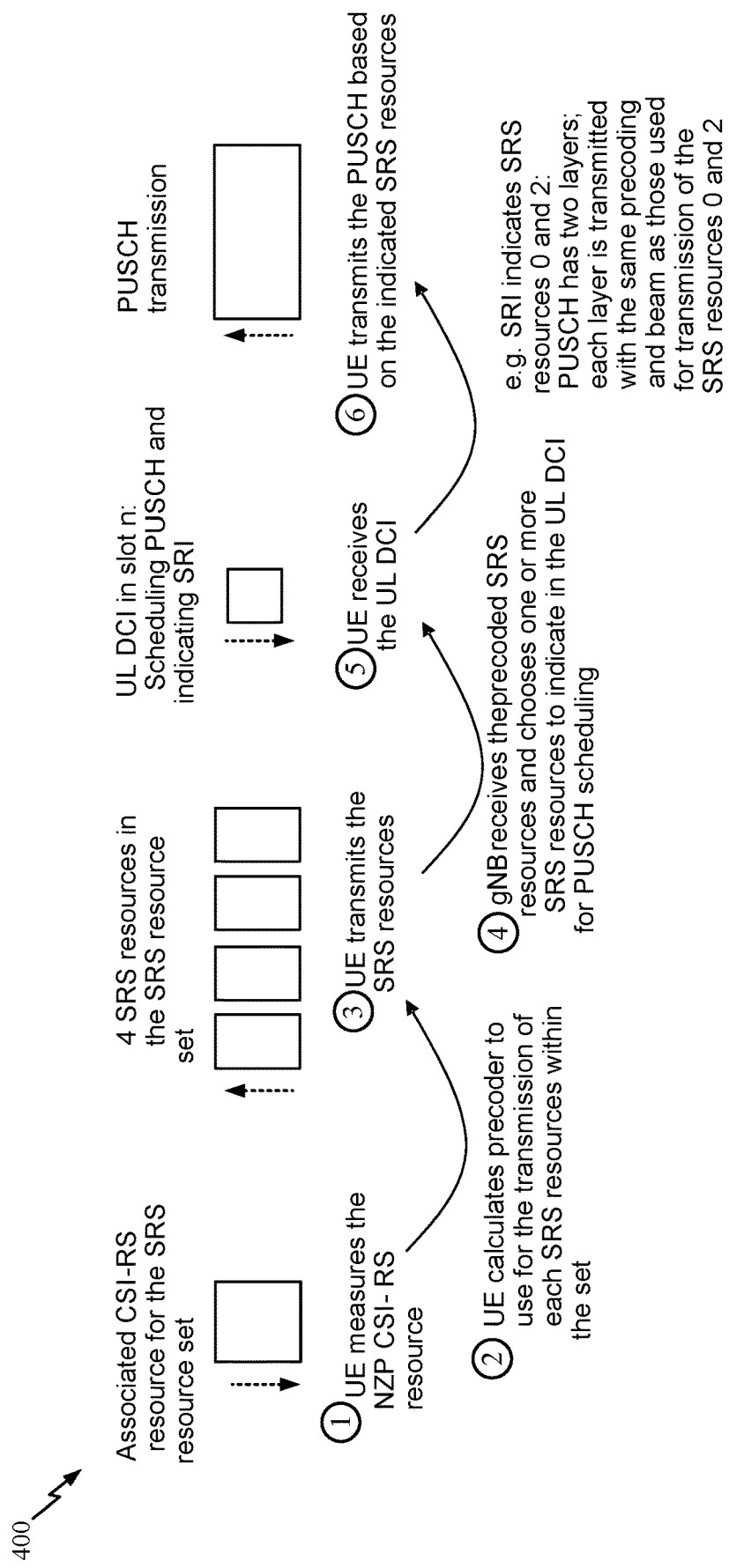
FIG. 4 illustrates an example non-codebook based uplink transmission, in accordance with certain aspects of the present disclosure.

FIG. 4 illustrates an example non-codebook based uplink transmission, such as in Release 15 for example. As shown, the UE may measure the non-zero-power (NZP) CSI-RS resource, based on which the UE calculates a precoder to use the transmission of each SRS resources within the set. The UE transmits the SRS resources (e.g., four SRS resources shown in a SRS resource set). The network or base station (e.g., gNB) receives the precoded SRS resources from the UE and chooses one or more SRS resources to indicate in the UL DCI for PUSCH scheduling (e.g., based on some metric). The base station transmits the UL DCI to the UE. The UL DCI in slot n schedules the PUSCH transmission in a later slot n+x and indicates SRI. The indicated SRI is associated with the most recent transmission of SRS resource(s) identified by the SRI. The SRS transmission is prior to the PDCCH carrying the SCI.

After receiving the UL DCI from the base station, the UE transmits the PUSCH based on the indicated SRS resources indicated by the UL DCI. For example, assuming the SRI indicates SRS resources 0 and 2 (and assuming the PUSCH has two layers), each layer is transmitted with the same precoding and beam as those used for transmission of the SRS resources 0 and 2.

According to certain aspects of the present disclosure, the UE may indicate the following capabilities. First, the UE may indicate codebook based and non-codebook based capabilities (in some cases, separately). For example, in maxNumberSRS-ResourcePerSet, the UE may define the maximum number of SRS resources per SRS resource set configured for codebook or non-codebook based transmission to the UE. This indication is per CC per band of a supported band combination.

Second, the UE may indicate srs-AssocCSI-RS, which defines parameters for the calculation of the precoder for SRS transmission based on channel measurements using associated NZP CSI-RS resource. This indication is limited to non-codebook based uplink transmission and parameters of the associated CSI-RS resources. This capability signalling includes list of the following parameters: (1) maxNumberTxPortsPerResource indicating the maximum number of Tx ports in a resource; (2) maxNumberResourcesPerBand indicating the maximum number of resources across all CCs within a band simultaneously; and (3) totalNumberTxPortsPerBand indicating the total number of Tx ports across all CCs within a band simultaneously.

Third, the UE may indicate csi-RS-ProcFrameworkForSRS, which indicates support of CSI-RS processing framework for SRS. This may apply only to non-codebook based uplink transmissions. This capability signalling includes the following parameters: (1) maxNumberPeriodicSRS-AssocCSI-RS-PerBWP indicating the maximum number of periodic SRS resources associated with CSI-RS per BWP; (2) maxNumberAperiodicSRS-AssocCSI-RS-PerBWP indicating the maximum number of aperiodic SRS resources associated with CSI-RS per BWP; (3) maxNumberSP-SRS-AssocCSI-RS-PerBWP indicating the maximum number of semi-persistent SRS resources associated with CSI-RS per BWP; and (4) simultaneousSRS-AssocCSI-RS-PerCC indicating the number of SRS resources that the UE can process simultaneously in a CC, including periodic, aperiodic and semi-persistent SRS.

Lastly, the UE may indicate simultaneousSRS-AssocCSI-RS-AllCC, which indicates support of CSI-RS processing framework for SRS and the number of SRS resources that the UE can process simultaneously across all CCs, and across MCG and SCG in case of NR-DC, including periodic, aperiodic and semi-persistent SRS. This parameter may further limit simultaneousSRS-AssocCSI-RS-PerCC in MIMO-ParametersPerBand and Phy-ParametersFRX-Diff for each band in a given band combination. This may apply only to non-codebook based uplink transmissions.

Figure 5:
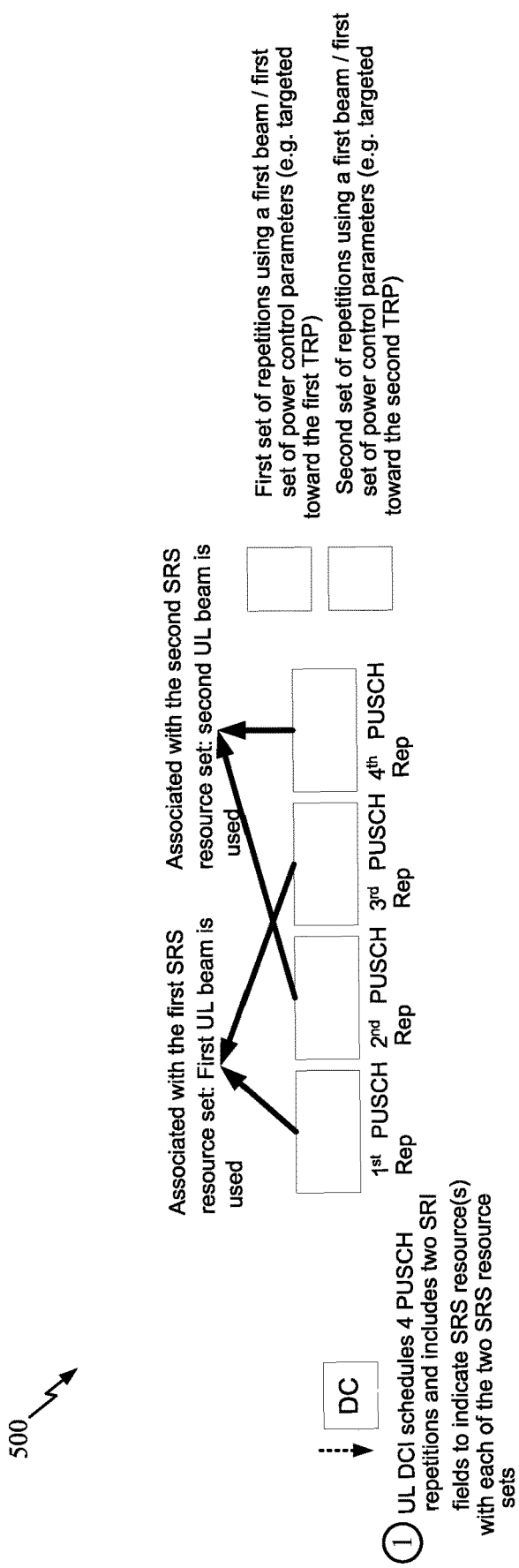
FIG. 5 illustrates an example multiple transmission and reception points (multi-TRP) physical uplink shared channel (PUSCH) repetition, in accordance with certain aspects of the present disclosure.

FIG. 5 illustrates an example multi-transmission and reception point (multi-TRP) physical uplink shared channel (PUSCH) repetition, in accordance with certain aspects of the present disclosure. As multi-TRP or multi-panel aims to improve reliability and robustness for PUSCH transmissions, when one link (e.g., to one TRP) is blocked, another repetition may be decoded by the other TRP (or panel).

In one aspect, PUSCH repetitions include Type A and Type B. Different PUSCH transmission occasions (i.e. repetitions) corresponding to the same TB are transmitted in different slots or mini-slots. The number of repetitions can be RRC configured (e.g., in Rel. 15) or can be indicated dynamically through a time domain resource assignment (TDRA) field of the DCI (e.g., Rel. 16). In some cases, all the repetitions may be transmitted with the same beam (the SRI field of the DCI is applied to all the repetitions).

When different PUSCH repetitions are intended to be received at different TRPs, (or panels/antennas) at the network side, different beams or power control parameters are required. For example, as shown in FIG. 5, PUSCH repetitions may belong to two sets, each set has its own beam, power control, and other parameters or settings. The UP DCI schedules four PUSCH repetitions and includes two SRI fields to indicate SRS resource(s) with each of the two SRS resource sets. Each set of PUSCH repetitions uses a respective beam and/or power control parameters for the respective TRP. That is, the two sets of repetitions correspond to two SRS resource sets (DCI indicates two beams/two sets of power control parameters by indicating one or more SRS resources within each of the two SRS resource sets).

Capability for Codebook Based and Non-Codebook Based Multi-TRP PUSCH

To fully use the above-mentioned features that increase signal diversity and thus reliability and robustness in multi-TRP PUSCH repetitions, aspects of the present disclosure extends the multi-TRP capability signaling for codebook based and non-codebook based uplink transmissions. For example, a UE may signal to a network entity an indication of a capability to support PUSCH transmission with at least two sets of repetitions associated with different SRS resource sets.

Figure 6:
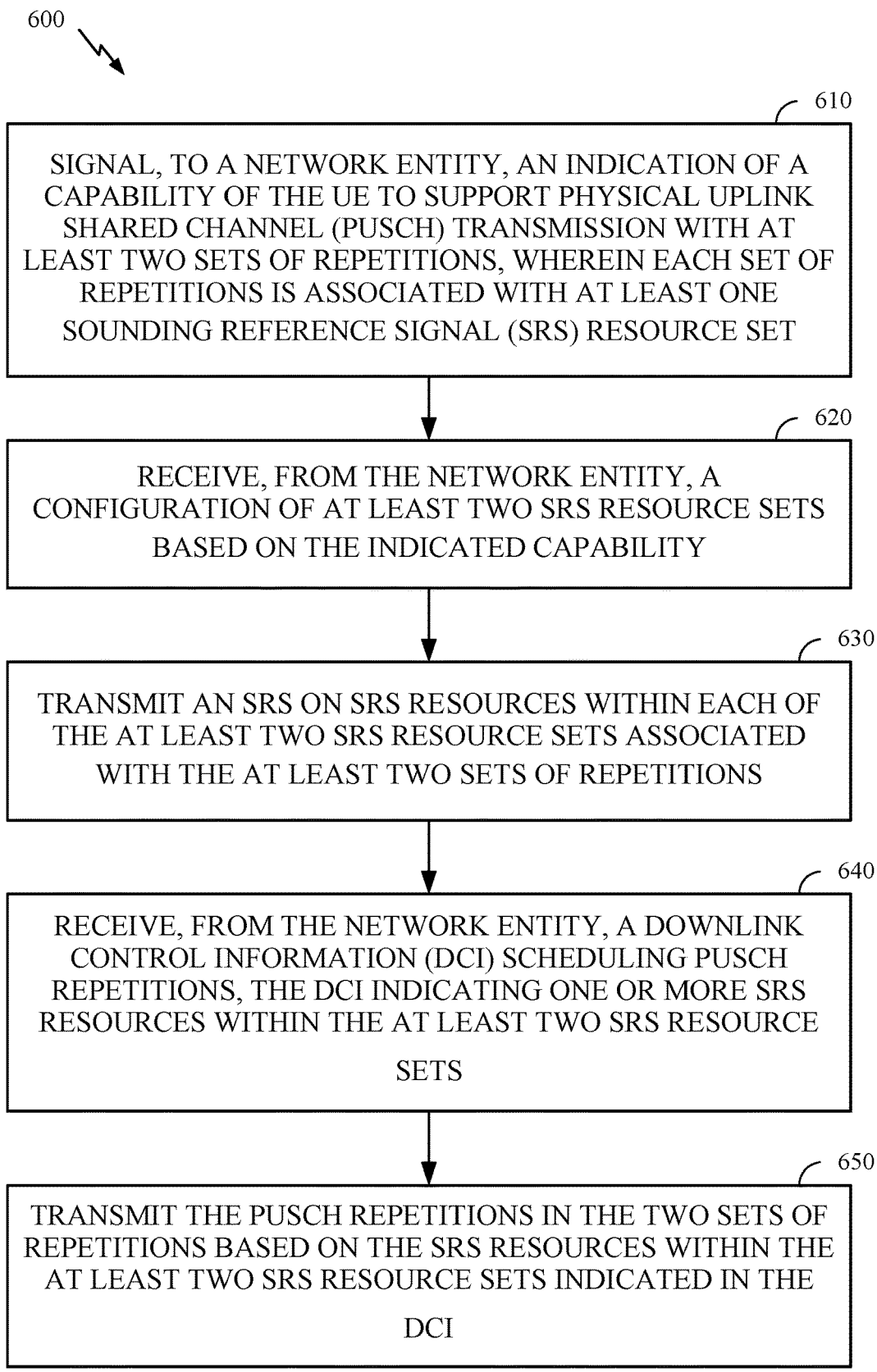
FIG. 6 is a flow diagram illustrating example operations for wireless communications by a UE, in accordance with certain aspects of the present disclosure.

FIG. 6 is a flow diagram illustrating example operations 600 for wireless communication, in accordance with certain aspects of the present disclosure. The operations 600 may be performed, for example, by UE (e.g., such as a UE 120a in the wireless communication network 100).

Operations 600 may be implemented as software components that are executed and run on one or more processors (e.g., controller/processor 260 of FIG. 2). Further, the transmission and reception of signals by the UE in operations 600 may be enabled, for example, by one or more antennas (e.g., antennas 252 of FIG. 2). In certain aspects, the transmission and/or reception of signals by the UE may be implemented via a bus interface of one or more processors (e.g., controller/processor 260) obtaining and/or outputting signals.

The operations 600 begin, at 610, by signaling to a network entity an indication of a capability of the UE to support PUSCH transmission with at least two sets of repetitions. Each set of the at least two sets of repetitions is associated with at least one sounding reference signal (SRS) resource set.

At 620, the UE receives from the network entity a configuration of at least two SRS resource sets based on the indicated capability. At 630, the UE transmits SRS on SRS resources within each of the at least two SRS resource sets associated with the at least two sets of repetitions.

At 640, the UE receives from the network entity, a downlink control information (DCI) scheduling PUSCH repetitions. The DCI indicates one or more SRS resources within the at least two SRS resource set.

At 650, the UE transmits the PUSCH repetitions in the two sets of repetitions based on the SRS resources within the at least two SRS resource sets indicated in the DCI.

Figure 7:
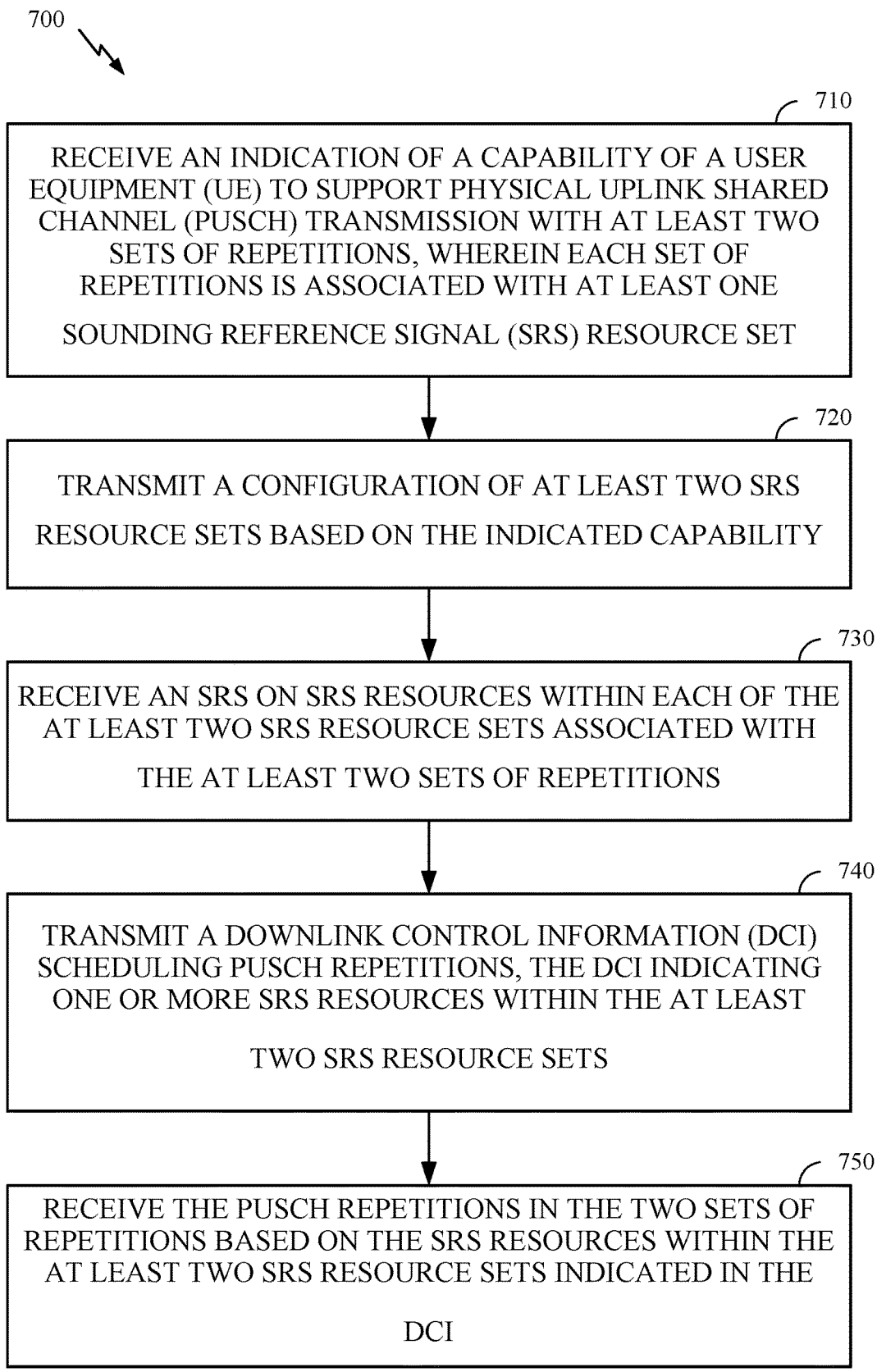
FIG. 7 is a flow diagram illustrating example operations for wireless communications by a network entity, in accordance with certain aspects of the present disclosure.

FIG. 7 is a flow diagram illustrating example operations 700 for wireless communication, in accordance with certain aspects of the present disclosure. The operations 700 may be performed, for example, by a network entity (e.g., such as the BS 110a in the wireless communication network 100 or a CU, DU, or RU of a disaggregated base station). The operations 700 may be complimentary operations by the network entity to the operations 600 performed by the UE.

Operations 700 may be implemented as software components that are executed and run on one or more processors (e.g., controller/processor 240 of FIG. 2). Further, the transmission and reception of signals by the network entity in operations 700 may be enabled, for example, by one or more antennas (e.g., antennas 234 of FIG. 2). In certain aspects, the transmission and/or reception of signals by the UE may be implemented via a bus interface of one or more processors (e.g., controller/processor 240) obtaining and/or outputting signals.

The operations 700 begin, at 710, by receiving an indication of a capability of a UE to support PUSCH transmission with at least two sets of repetitions. Each set of repetitions is associated with at least one SRS resource set. At 720, the network entity transmits a configuration of at least two SRS resource sets based on the indicated capability.

At 730, the network entity receives SRS on SRS resources within each of the at least two SRS resource sets associated with the at least two sets of repetitions. At 740, the network entity transmits a DCI scheduling PUSCH repetitions, the DCI indicating one or more SRS resources within the at least two SRS resource sets.

At 750, the network entity receives the PUSCH repetitions in the two sets of repetitions based on the SRS resources within the at least two SRS resource sets indicated in the DCI.

Figure 8:
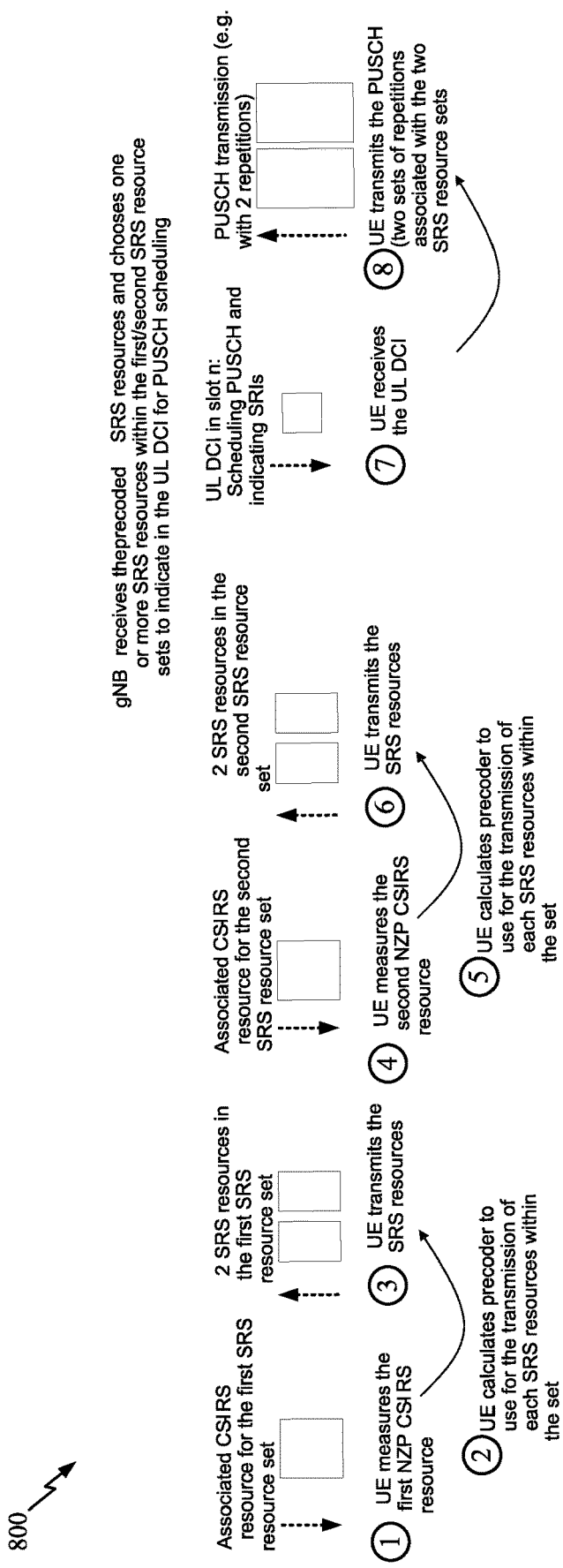
FIG. 8 illustrates and example non-codebook based multi-TRP PUSCH transmission, in accordance with certain aspects of the present disclosure.

An example of a non-codebook based multi-TRP PUSCH transmission according to the operations 600 and 700 is illustrated in FIG. 8. As shown in the timeline 800 of FIG. 8, the UE first indicates to the network entity the described capabilities, including, e.g., non-codebook based mTRP PUSCH (two SRS resource sets), such as 4 SRS resources within each SRS resource set, 6 SRS resources across both SRS resource sets, two associated CSI-RS resources per BWP, 2 SRS resources per BWP associated with one CSI-RS resource, 4 SRS resources per BWP associate with either of the CSI-RS resources.

The network entity then configures two SRS resource sets with usage set to "noncodebook," each SRS resource set configured with 2 SRS resources and an associated CSI-RS resource. In some cases, an SRS resource set may be configured with just one SRS resource.

The UE may then measure, from a first TRP, CSI-RS resources and precodes the SRS resources within the corresponding SRS resource sets. This is shown as the UE measuring the first NZP CSI-RS resource on the left of FIG. 8. The UE may then calculate a precoder to use for the transmission of each SRS resources within the set. The UE may also measure, from a second TRP, CSI-RS resources and precodes the SRS resources within the corresponding SRS resource sets. This is shown as the UE measuring the second NZP CSI-RS resource at the middle of FIG. 8.

When the network entity receives the precoded SRS resources, the network entity chooses one or more SRS resources within the first or the second SRS resource set to indicate in the UL DCI for PUSCH scheduling. That is, the network entity schedules PUSCH with two sets of repetitions and indicates one or more SRS resources within the first SRS resource set and one or more SRS resources within the second SRS resource set (based on received SRS resources).

The UE receives the UL DCI from the network. The UE transmits the PUSCH (the two sets of repetitions) based on the indicated SRS resources within the two SRS resource sets.

In some aspects, the UE indicates separate capabilities of the UE to support codebook based PUSCH transmission with at least two sets of repetitions associated with at least two SRS resource sets; and non-codebook based PUSCH transmission with at least two sets of repetitions associated with at least two SRS resource sets.

In some aspects, the UE indicates separate capabilities of the UE to support PUSCH transmission with at least two sets of repetitions of a first type associated with at least two SRS resource sets; and PUSCH transmission with at least two sets of repetitions of a second type associated with at least two SRS resource sets.

In some aspects, the UE indicates: a number of supported SRS resources across the at least two SRS resource sets. In some cases, the UE further indicates a number of supported SRS resources per SRS resource set for bandwidth part (BWP) and component carrier (CC) combinations configured with at least two SRS resource sets.

For example, in a first option, in addition to the "maxNumberSRS-ResourcePerSet" as specified in Release 15, a new capability may be added to indicate the number of supported SRS resources across both SRS resource sets (i.e., associated with different TRPs). For example, the UE may indicate four SRS resources per SRS resource set and six SRS resources across the two SRS resource sets. A different number of SRS resources for two or more SRS resource sets may be indicated in different scenarios. In some cases, the UE may indicate a number of supported SRS resources per SRS resource set. In some cases, the UE may indicate different numbers of SRS resources supported for different SRS resource sets. In some cases, the UE may indicate a different number of SRS resources per SRS set or for different scenarios.

In a second option, in addition to the "maxNumberSRS-ResourcePerSet" of Release 15 being interpreted as the number of supported SRS resource across the two SRS resource sets, a new capability may be added to indicate the number of supported SRS resource sets per SRS resource set specific to BWPs and/or CCs, which are configured with two SRS resource sets.

In a third option, two new capabilities are added to indicate the number of supported SRS resources per SRS resource set and the number of supported SRS resources across both SRS resource sets. The capabilities are specific to BWPs/CCs that are configured with two SRS resources set.

In some cases, the UE further indicates a number of supported SRS resources per BWP associated with either of the CSI-RS resources. For example, new capabilities specific to BWPs and/or CCs that are configured with two SRS resource sets may be added to indicate the number of supported SRS resources per SRS resource set and the number of supported SRS resources across both SRS resource sets.

For example, "csi-RS-ProcFrameworkForSRS" is used to indicate the maximum number of SRS resources per BWP that are associated with one of the CSI-RS resources. When UE indicates support of 2 associated CSI-RS resources per BWP per CC, UE can further indicate the maximum supported number of SRS resources per BWP associated with either of the two CSI-RS resources (i.e., number of SRS resources across the two SRS resource sets when each of the two SRS resource sets is configured with an associated CSI-RS resource). The capability can be separate for number of periodic, aperiodic, or semi-persistent SRS resources per BWP and number of SRS resources that the UE can process simultaneously in a CC, including periodic, aperiodic and semi-persistent SRS.

The number of SRS resources associated with CSI-RS may also be indicated according to three options. In a first option, in addition to indicating a maximum number of SRS resources per BWP that are associated with one of the CSI-RS resources, when the UE indicates support of 2 associated CSI-RS resources per BWP per CC, a new capability may be added to indicate the maximum number of supported SRS resources per BWP associated with either of the two CSI-RS resources (i.e., the number of SRS resources across the two SRS resource sets when each of the two SRS resource sets is configured with an associated CSI-RS resource). In a second option, in addition to indicating a maximum number of SRS resources across the associated CSI-RS resources, a new capability may be added to indicate the maximum number of SRS resources for each associated CSI-RS resource. In a third option, two new capabilities may be added, including one for the number of supported SRS resources per associated CSI-RS resource, and another one for the number of supported SRS resources across the associated CSI-RS resources.

In some aspects, when the UE indicates capabilities of the UE to support non-codebook based PUSCH transmission with at least two sets of repetitions associated with at least two SRS resource sets, the UE may also indicate support of one or more associated CSI-RS resources for calculating a precoder for SRS transmission using the CSI-RS measurements. In some cases, the UE indicates a number of associated CSI-RS resources per BWP and CC combination. In some cases, the UE further indicates a number of supported CSI-RS ports across the associated CSI-RS resources.

In a first option, in addition to Release 15's capability indicated by "maxNumberTxPortsPerResource" for the maximum number of ports (interchangeable with the supported number of ports) for each associated CSI-RS resource, a new capability is added to indicate number of supported CSI-RS ports across the associated CSI-RS resources. In a second option, in addition to indicating the capability by "maxNumberTxPortsPerResource" for a maximum number of ports across the associated CSI-RS resources, a new capability is added to indicate the maximum number of ports for each associated CSI-RS resources. In a third option, two new capabilities are added, including one for the number of supported CSI-RS ports per associated CSI-RS resource, and another one for the number of supported CSI-RS ports across the associated CSI-RS resources.

For example, when the UE indicates the support of non-codebook based mTRP PUSCH (two SRS resource sets with usage set to "noncodebook"), UE can further indicate the support of associated CSI-RS resource(s) for calculating precoder for SRS transmission using the CSI-RS measurements. The number of associated CSI-RS resources per BWP per CC can be indicated by the UE (e.g. 1 or 2 CSI-RS resources). For example, if the UE indicates 1 CSI-RS resource per BWP per CC is supported, only one of the two SRS resource sets can be configured with associated CSI-RS resource.

In some cases, such as in non-codebook based uplink transmissions, the configuration of at least two SRS resource sets received from the network entity indicates SRS resources within each of the at least two SRS resource sets, and associated CSI-RS resources configured for each of the at least two SRS resource sets. In some cases, the UE further measures CSI-RS on the CSI-RS resources configured for each of the at least two SRS resource sets. The UE calculates precoders based on the CSI-RS measurements; and applies the precoders when transmitting the SRS on SRS resources within each of the at least two SRS resource sets associated with the at least two sets of repetitions.

In some aspects, the UE further indicates at least one of a number of different spatial relation information(s) that different SRS resources can have across the at least two SRS resource sets; or a number of different spatial relation information(s) that different SRS resources can have per SRS resource set. For example, the UE can further indicate number of different spatial relation information's (UL beams) that different SRS resources can have across both SRS resource sets or per SRS resource set. For example, the UE can support 4 SRS resources per set and 8 SRS resources across both sets, but supports only one spatial relation info for all SRS resources within a set and two spatial relation info's for all SRS resources across both sets, i.e., all SRS resources with a set should be configured with the same spatial relation information.

In some aspects, when the UE indicates capabilities of the UE to support codebook based PUSCH transmission with at least two sets of repetitions associated with at least two SRS resource sets, the UE further indicates at least one of: whether different SRS resources can have different numbers of SRS ports within an SRS resource set; or whether different SRS resources can have different numbers of SRS ports across the at least two SRS resource sets. In some cases, the UE further indicates a number of SRS ports that each SRS resource can be configured with for a first SRS resource set of the at least two SRS resource sets and for a second SRS resource set of the at least two SRS resource sets. For example, the UE can further indicate whether different SRS resources can have different number of ports within a SRS resource set and across the two SRS resource set. In addition, UE can indicate the number of SRS ports that each SRS resource can be configured with for the first SRS resource set and for the second SRS resource set. For example, the UE can support 1, 2, and 4 ports when configured with one SRS resource set (not configured with mTRP PUSCH), but in the case of 2 SRS resource sets (mTRP PUSCH), can only support 1 and 2 ports for each SRS resource.

Figure 9:
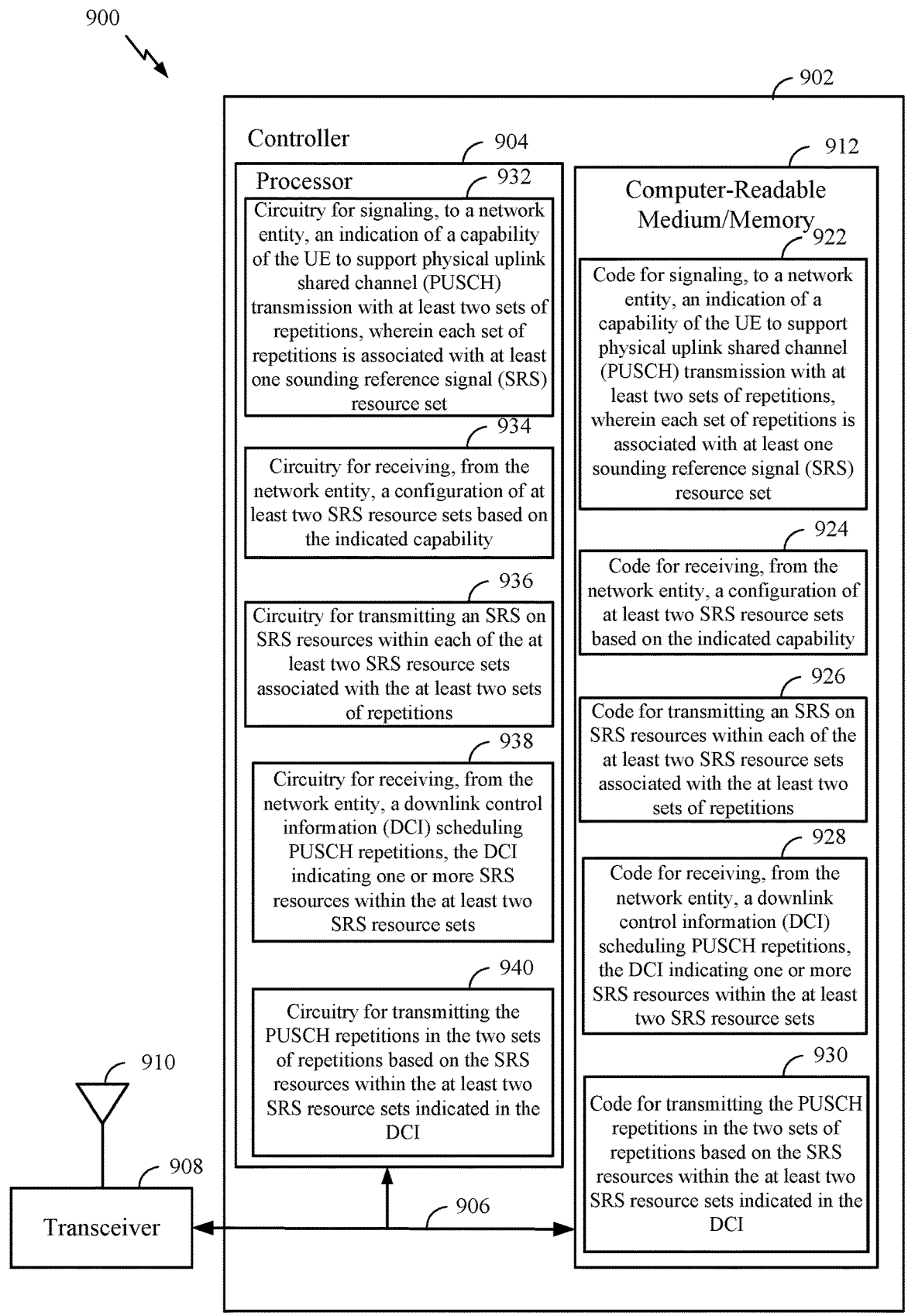
FIGS. 9 and 10 illustrate example communications devices that may include various components configured to perform operations for the techniques disclosed herein in accordance with aspects of the present disclosure.

FIG. 9 illustrates a communications device 900 that may include various components (e.g., corresponding to means-plus-function components) configured to perform operations for the techniques disclosed herein, such as the operations illustrated in FIG. 6. The communications device 900 includes a processing system 902 coupled to a transceiver 908 (e.g., a transmitter and/or a receiver). The transceiver 908 is configured to transmit and receive signals for the communications device 900 via an antenna 910, such as the various signals as described herein. The processing system 902 may be configured to perform processing functions for the communications device 900, including processing signals received and/or to be transmitted by the communications device 900.

The processing system 918 includes a processor 904 coupled to a computer-readable medium/memory 912 via a bus 906. In certain aspects, the computer-readable medium/ memory 912 is configured to store instructions (e.g., computer-executable code) that when executed by the processor 904, cause the processor 904 to perform the operations illustrated in FIG. 6, or other operations for performing the various techniques discussed herein. In certain aspects, computer-readable medium/memory 912 stores code 922 for signaling, to a network entity, an indication of a capability of the UE to support physical uplink shared channel (PUSCH) transmission with at least two sets of repetitions, wherein each set of repetitions is associated with at least one sounding reference signal (SRS) resource set, code 924 for receiving, from the network entity, a configuration of at least two SRS resource sets based on the indicated capability, code 926 for transmitting an SRS on SRS resources within each of the at least two SRS resource sets associated with the at least two sets of repetitions, code 928 for receiving, from the network entity, a downlink control information (DCI) scheduling PUSCH repetitions, the DCI indicating one or more SRS resources within the at least two SRS resource sets, and code 930 for transmitting the PUSCH repetitions in the two sets of repetitions based on the SRS resources within the at least two SRS resource sets indicated in the DCI.

In certain aspects, the processor 904 has circuitry configured to implement the code stored in the computer-readable medium/memory 912. The processor 904 includes circuitry 932 for signaling, to a network entity, an indication of a capability of the UE to support PUSCH transmission with at least two sets of repetitions, wherein each set of repetitions is associated with at least one SRS resource set, circuitry 934 for receiving, from the network entity, a configuration of at least two SRS resource sets based on the indicated capability, circuitry 936 for transmitting an SRS on SRS resources within each of the at least two SRS resource sets associated with the at least two sets of repetitions, circuitry 938 for receiving, from the network entity, a downlink control information (DCI) scheduling PUSCH repetitions, the DCI indicating one or more SRS resources within the at least two SRS resource sets, and circuitry 940 for transmitting the PUSCH repetitions in the two sets of repetitions based on the SRS resources within the at least two SRS resource sets indicated in the DCI.

Figure 10:
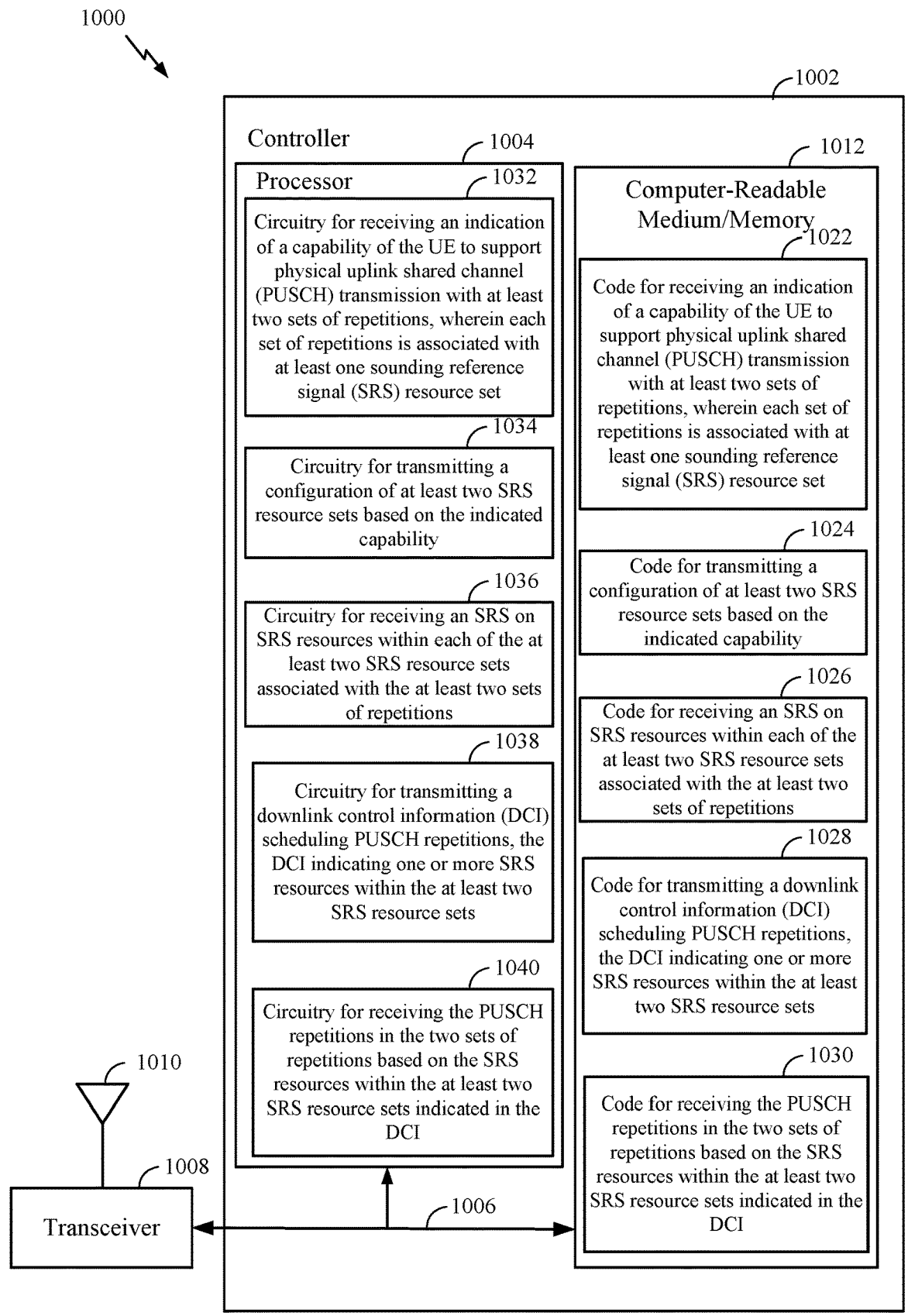

FIG. 10 illustrates a communications device 1000 that may include various components (e.g., corresponding to means-plus-function components) configured to perform operations for the techniques disclosed herein, such as the operations illustrated in FIG. 7. The communications device 1000 includes a processing system 1002 coupled to a transceiver 1008 (e.g., a transmitter and/or a receiver). The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

The processing system 1018 includes a processor 1004 coupled to a computer-readable medium/memory 1012 via a bus 1006. In certain aspects, the computer-readable medium/ memory 1012 is configured to store instructions (e.g., computer-executable code) that when executed by the processor 1004, cause the processor 1004 to perform the operations illustrated in FIG. 7, or other operations for performing the various techniques discussed herein. In certain aspects, computer-readable medium/memory 1012 stores code 1022 for receiving an indication of a capability of a UE to support PUSCH transmission with at least two sets of repetitions, wherein each set of repetitions is associated with at least one SRS resource set, code 1024 for transmitting a configuration of at least two SRS resource sets based on the indicated capability, code 1026 for receiving an SRS on SRS resources within each of the at least two SRS resource sets associated with the at least two sets of repetitions, code 1028 for transmitting a downlink control information (DCI) scheduling PUSCH repetitions, the DCI indicating one or more SRS resources within the at least two SRS resource sets, and code 1030 for receiving the PUSCH repetitions in the two sets of repetitions based on the SRS resources within the at least two SRS resource sets indicated in the DCI.

In certain aspects, the processor 1004 has circuitry configured to implement the code stored in the computer-readable medium/memory 1012. The processor 1004 includes circuitry 1032 for receiving an indication of a capability of a UE to support PUSCH transmission with at least two sets of repetitions, wherein each set of repetitions is associated with at least one SRS resource set, circuitry 1034 for transmitting a configuration of at least two SRS resource sets based on the indicated capability, circuitry 1036 for receiving an SRS on SRS resources within each of the at least two SRS resource sets associated with the at least two sets of repetitions, circuitry 1038 for transmitting a downlink control information (DCI) scheduling PUSCH repetitions, the DCI indicating one or more SRS resources within the at least two SRS resource sets, and circuitry 1040 for receiving the PUSCH repetitions in the two sets of repetitions based on the SRS resources within the at least two SRS resource sets indicated in the DCI.

Example Clauses

Implementation examples are described in the following numbered clauses:

Clause 1: A method for wireless communications by a user equipment (UE), comprising: signaling, to a network entity, an indication of a capability of the UE to support physical uplink shared channel (PUSCH) transmission with at least two sets of repetitions, wherein each set of repetitions is associated with at least one sounding reference signal (SRS) resource set; receiving, from the network entity, a configuration of at least two SRS resource sets based on the indicated capability; transmitting an SRS on SRS resources within each of the at least two SRS resource sets associated with the at least two sets of repetitions; receiving, from the network entity, a downlink control information (DCI) scheduling PUSCH repetitions, the DCI indicating one or more SRS resources within the at least two SRS resource sets; and transmitting the PUSCH repetitions in the two sets of repetitions based on the SRS resources within the at least two SRS resource sets indicated in the DCI.

Clause 2: The method of Clause 1, wherein the UE indicates separate capabilities of the UE to support: codebook based PUSCH transmission with at least two sets of repetitions associated with at least two SRS resource sets; and non-codebook based PUSCH transmission with at least two sets of repetitions associated with at least two SRS resource sets.

Clause 3: The method of any one of Clauses 1-2, wherein the UE indicates separate capabilities of the UE to support: PUSCH transmission with at least two sets of repetitions of a first type associated with at least two SRS resource sets; and PUSCH transmission with at least two sets of repetitions of a second type associated with at least two SRS resource sets.

Clause 4: The method of any one of Clauses 1-3, wherein the UE indicates: a number of supported SRS resources across the at least two SRS resource sets.

Clause 5: The method of Clause 4, wherein the UE further indicates: a number of supported SRS resources per SRS resource set for bandwidth part (BWP) and component carrier (CC) combinations configured with at least two SRS resource sets.

Clause 6: The method of Clause 4, wherein the UE indicates the number of supported SRS resources across the at least two SRS resource sets for bandwidth part (BWP) and component carrier (CC) combinations configured with at least two SRS resource sets.

Clause 7: The method of any one of Clauses 1-6, wherein: when the UE indicates capabilities of the UE to support non-codebook based PUSCH transmission with at least two sets of repetitions associated with at least two SRS resource sets, the UE also indicates support of one or more associated channel state information reference signals (CSI-RS) resources for calculating a precoder for SRS transmission using the CSI-RS measurements.

Clause 8: The method of Clause 7, wherein the UE indicates a number of associated CSI-RS resources per bandwidth part (BWP) and component carrier (CC) combination.

Clause 9: The method of Clause 8, wherein the UE further indicates: a number of supported CSI-RS ports across the associated CSI-RS resources.

Clause 10: The method of Clause 8, wherein the UE further indicates: a number of supported SRS resources per BWP associated with either of the CSI-RS resources.

Clause 11: The method of Clause 7, wherein the configuration of at least two SRS resource sets received from the network entity indicates SRS resources within each of the at least two SRS resource sets, and associated CSI-RS resources configured for each of the at least two SRS resource sets.

Clause 12: The method of Clause 11, further comprising: measuring CSI-RS on the CSI-RS resources configured for each of the at least two SRS resource sets; calculating precoders based on the CSI-RS measurements; and applying the precoders when transmitting the SRS on SRS resources within each of the at least two SRS resource sets associated with the at least two sets of repetitions.

Clause 13: The method of any one of Clauses 1-12, wherein the UE further indicates at least one of: a number of different spatial relation informations that different SRS resources can have across the at least two SRS resource sets; or a number of different spatial relation informations that different SRS resources can have per SRS resource set.

Clause 14: The method of any one of Clauses 1-13, wherein when the UE indicates capabilities of the UE to support codebook based PUSCH transmission with at least two sets of repetitions associated with at least two SRS resource sets, the UE further indicates at least one of: whether different SRS resources can have different numbers of SRS ports within an SRS resource set; or, whether different SRS resources can have different numbers of SRS ports across the at least two SRS resource sets.

Clause 15: The method of any one of Clauses 1-14, wherein when the UE indicates capabilities of the UE to support codebook based PUSCH transmission with at least two sets of repetitions associated with at least two SRS resource sets, the UE further indicates a number of SRS ports that each SRS resource can be configured with for a first SRS resource set of the at least two SRS resource sets and for a second SRS resource set of the at least two SRS resource sets.

Clause 16: A method for wireless communications by a network entity, comprising: receiving, from a user equipment (UE), an indication of a capability of the UE to support physical uplink shared channel (PUSCH) transmission with at least two sets of repetitions, wherein each set of repetitions is associated with at least one sounding reference signal (SRS) resource set; transmitting, to the UE, a configuration of at least two SRS resource sets based on the indicated capability; receiving an SRS on SRS resources within each of the at least two SRS resource sets associated with the at least two sets of repetitions; transmitting to the UE a downlink control information (DCI) scheduling PUSCH repetitions, the DCI indicating one or more SRS resources within the at least two SRS resource sets; and receiving from the UE the PUSCH repetitions in the two sets of repetitions based on the SRS resources within the at least two SRS resource sets indicated in the DCI.

Clause 17: The method of Clause 16, wherein the UE indicates separate capabilities of the UE to support: codebook based PUSCH transmission with at least two sets of repetitions associated with at least two SRS resource sets; and non-codebook based PUSCH transmission with at least two sets of repetitions associated with at least two SRS resource sets.

Clause 18: The method of any one of Clauses 16-17, wherein the UE indicates separate capabilities of the UE to support: PUSCH transmission with at least two sets of repetitions of a first type associated with at least two SRS resource sets; and PUSCH transmission with at least two sets of repetitions of a second type associated with at least two SRS resource sets.

Clause 19: The method of any one of Clauses 16-18, wherein the UE indicates: a number of supported SRS resources across the at least two SRS resource sets.

Clause 20: The method of Clause 19, wherein the UE further indicates: a number of supported SRS resources per SRS resource set for bandwidth part (BWP) and component carrier (CC) combinations configured with at least two SRS resource sets.

Clause 21: The method of Clause 19, wherein the UE indicates the number of supported SRS resources across the at least two SRS resource sets for bandwidth part (BWP) and component carrier (CC) combinations configured with at least two SRS resource sets.

Clause 22: The method of any one of Clauses 16-21, wherein: when the UE indicates capabilities of the UE to support non-codebook based PUSCH transmission with at least two sets of repetitions associated with at least two SRS resource sets, the UE also indicates support of one or more associated channel state information reference signals (CSI-RS) resources for calculating a precoder for SRS transmission using the CSI-RS measurements.

Clause 23: The method of Clause 22, wherein the UE indicates a number of associated CSI-RS resources per bandwidth part (BWP) and component carrier (CC) combination.

Clause 24: The method of Clause 23, wherein the UE further indicates: a number of supported CSI-RS ports across the associated CSI-RS resources.

Clause 25: The method of Clause 23, wherein the UE further indicates: a number of supported SRS resources per BWP associated with either of the CSI-RS resources.

Clause 26: The method of Clause 22, wherein the configuration of at least two SRS resource sets received from the network entity indicates SRS resources within each of the at least two SRS resource sets, and associated CSI-RS resources configured for each of the at least two SRS resource sets.

Clause 27: The method of any one of Clauses 16-26, wherein the UE further indicates at least one of: a number of different spatial relation informations that different SRS resources can have across the at least two SRS resource sets; or a number of different spatial relation informations that different SRS resources can have per SRS resource set.

Clause 28: The method of any one of Clauses 16-27, wherein when the UE indicates capabilities of the UE to support codebook based PUSCH transmission with at least two sets of repetitions associated with at least two SRS resource sets, the UE further indicates at least one of: whether different SRS resources can have different numbers of SRS ports within an SRS resource set; or whether different SRS resources can have different numbers of SRS ports across the at least two SRS resource sets.

Clause 29: The method of any one of Clauses 16-28, wherein when the UE indicates capabilities of the UE to support codebook based PUSCH transmission with at least two sets of repetitions associated with at least two SRS resource sets, the UE further indicates a number of SRS ports that each SRS resource can be configured with for a first SRS resource set of the at least two SRS resource sets and for a second SRS resource set of the at least two SRS resource sets.

Clause 30: An apparatus, comprising: a memory comprising executable instructions; one or more processors configured to execute the executable instructions and cause the apparatus to perform a method in accordance with any one of Clauses 1-29.

Clause 31: An apparatus, comprising means for performing a method in accordance with any one of Clauses 1-29.

Clause 32: A non-transitory computer-readable medium comprising executable instructions that, when executed by one or more processors of an apparatus, cause the apparatus to perform a method in accordance with any one of Clauses 1-29.

Clause 33: A computer program product embodied on a computer-readable storage medium comprising code for performing a method in accordance with any one of Clauses 1-29.

Additional Considerations

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 6 and 7.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above.

Various modifications, changes and variations may be made in the arrangement, operation and details of the methods and apparatus described above without departing from the scope of the claims.

What is claimed is:

1. An apparatus for wireless communications at a user equipment (UE), the apparatus comprising:
    at least one processor;
    at least one memory coupled with the at least one processor; and
    instructions stored in the at least one memory and executable by the at least one processor to cause the apparatus to:
        signal, to a network entity, an indication of a capability of the UE to support codebook based or non-codebook based physical uplink shared channel (PUSCH) transmission with at least two sets of repetitions, wherein each set of repetitions is associated with at least one sounding reference signal (SRS) resource set, wherein when the UE indicates the capability of the UE to support non-codebook based PUSCH transmission with at least two sets of repetitions associated with at least two SRS resource sets, the UE also indicates support of one or more associated channel state information reference signals (CSI-RS) resources for calculating a precoder for SRS transmission using measurements of the one or more associated CSI-RS resources;
        receive, from the network entity, a configuration of at least two SRS resource sets based on the indicated capability;
        transmit an SRS on SRS resources within each of the at least two SRS resource sets associated with the at least two sets of repetitions;
        receive, from the network entity, a downlink control information (DCI) scheduling PUSCH repetitions, the DCI indicating one or more SRS resources within the at least two SRS resource sets; and
        transmit the PUSCH repetitions in the two sets of repetitions based on the SRS resources within the at least two SRS resource sets indicated in the DCI.

2. The apparatus of claim 1, wherein the UE indicates separate capabilities of the UE to support:
    codebook based PUSCH transmission with at least two sets of repetitions associated with at least two SRS resource sets; and
    non-codebook based PUSCH transmission with at least two sets of repetitions associated with at least two SRS resource sets.

3. The apparatus of claim 1, wherein the UE indicates separate capabilities of the UE to support:
    PUSCH transmission with at least two sets of repetitions of a first type associated with at least two SRS resource sets; and
    PUSCH transmission with at least two sets of repetitions of a second type associated with at least two SRS resource sets.

4. The apparatus of claim 1, wherein the UE indicates:
    a number of supported SRS resources across the at least two SRS resource sets.

5. The apparatus of claim 4, wherein the UE further indicates:
    a number of supported SRS resources per SRS resource set for bandwidth part (BWP) and component carrier (CC) combinations configured with at least two SRS resource sets.

6. The apparatus of claim 4, wherein the UE indicates the number of supported SRS resources across the at least two SRS resource sets for bandwidth part (BWP) and component carrier (CC) combinations configured with at least two SRS resource sets.

7. The apparatus of claim 1, wherein the UE indicates a number of associated CSI-RS resources per bandwidth part (BWP) and component carrier (CC) combination.

8. The apparatus of claim 7, wherein the UE further indicates:
    a number of supported CSI-RS ports across the associated CSI-RS resources.

9. The apparatus of claim 7, wherein the UE further indicates:
    a number of supported SRS resources per BWP associated with either of the CSI-RS resources.

10. The apparatus of claim 7, wherein the configuration of at least two SRS resource sets received from the network entity indicates SRS resources within each of the at least two SRS resource sets, and associated CSI-RS resources configured for each of the at least two SRS resource sets.

11. The apparatus of claim 10, wherein the instructions are further executable by the at least one processor to cause the apparatus to:
    measure CSI-RS on the CSI-RS resources configured for each of the at least two SRS resource sets;
    calculate precoders based on the CSI-RS measurements; and
    apply the precoders when transmitting the SRS on SRS resources within each of the at least two SRS resource sets associated with the at least two sets of repetitions.

12. The apparatus of claim 1, wherein the UE further indicates at least one of:
    a number of different spatial relation informations that different SRS resources can have across the at least two SRS resource sets; or
    a number of different spatial relation informations that different SRS resources can have per SRS resource set.

13. The apparatus of claim 1, wherein when the UE indicates capabilities of the UE to support codebook based PUSCH transmission with at least two sets of repetitions associated with at least two SRS resource sets, the UE further indicates at least one of:
    whether different SRS resources can have different numbers of SRS ports within an SRS resource set; or
    whether different SRS resources can have different numbers of SRS ports across the at least two SRS resource sets.

14. The apparatus of claim 1, wherein when the UE indicates capabilities of the UE to support codebook based PUSCH transmission with at least two sets of repetitions associated with at least two SRS resource sets, the UE further indicates a number of SRS ports that each SRS resource can be configured with for a first SRS resource set of the at least two SRS resource sets and for a second SRS resource set of the at least two SRS resource sets.

15. An apparatus for wireless communications at a network entity, the apparatus comprising:
    at least one processor;
    at least one memory coupled with the at least one processor; and
    instructions stored in the at least one memory and executable by the at least one processor to cause the apparatus to:
        receive an indication of a capability of a user equipment (UE) to support codebook based or non-codebook based physical uplink shared channel (PUSCH)

transmission with at least two sets of repetitions, wherein each set of repetitions is associated with at least one sounding reference signal (SRS) resource set, wherein when the apparatus receives the indication of the capability of the UE to support non-codebook based PUSCH transmission with at least two sets of repetitions associated with at least two SRS resource sets, the apparatus also receives an indication of the UE to support of one or more associated channel state information reference signals (CSI-RS) resources for calculating a precoder for SRS transmission using measurements of the one or more associated CSI-RS resources;

transmit a configuration of at least two SRS resource sets based on the indicated capability;

receive an SRS on SRS resources within each of the at least two SRS resource sets associated with the at least two sets of repetitions;

transmit a downlink control information (DCI) scheduling PUSCH repetitions from the UE, the DCI indicating one or more SRS resources within the at least two SRS resource sets; and receive the PUSCH repetitions in the two sets of repetitions based on the SRS resources within the at least two SRS resource sets indicated in the DCI.

16. The apparatus of claim 15, wherein the network entity receives indications of separate capabilities of the UE to support:
  codebook based PUSCH transmission with at least two sets of repetitions associated with at least two SRS resource sets; and
  non-codebook based PUSCH transmission with at least two sets of repetitions associated with at least two SRS resource sets.

17. The apparatus of claim 15, wherein network entity receives indications of separate capabilities of the UE to support:
  PUSCH transmission with at least two sets of repetitions of a first type associated with at least two SRS resource sets; and
  PUSCH transmission with at least two sets of repetitions of a second type associated with at least two SRS resource sets.

18. The apparatus of claim 15, wherein the network entity receives indication of:
  a number of supported SRS resources across the at least two SRS resource sets.

19. The apparatus of claim 18, the network entity receives further indication of:
  a number of supported SRS resources per SRS resource set for bandwidth part (BWP) and component carrier (CC) combinations configured with at least two SRS resource sets.

20. The apparatus of claim 18, wherein the network entity receives indication of the number of supported SRS resources across the at least two SRS resource sets for bandwidth part (BWP) and component carrier (CC) combinations configured with at least two SRS resource sets.

21. The apparatus of claim 15, wherein the network entity receives indication of a number of associated CSI-RS resources per bandwidth part (BWP) and component carrier (CC) combination.

22. The apparatus of claim 21, wherein the network entity receives further indication of:
  a number of supported CSI-RS ports across the associated CSI-RS resources.

23. The apparatus of claim 21, wherein the network entity receives further indication of:
  a number of supported SRS resources per BWP associated with either of the CSI-RS resources.

24. The apparatus of claim 15, wherein the configuration of at least two SRS resource sets received from the network entity indicates SRS resources within each of the at least two SRS resource sets, and associated CSI-RS resources configured for each of the at least two SRS resource sets.

25. The apparatus of claim 15, wherein the network entity receives further indication of at least one of:
  a number of different spatial relation informations that different SRS resources can have across the at least two SRS resource sets; or
  a number of different spatial relation informations that different SRS resources can have per SRS resource set.

26. The apparatus of claim 15, wherein when the network entity receives indication of capabilities of the UE to support codebook based PUSCH transmission with at least two sets of repetitions associated with at least two SRS resource sets, the UE further indicates at least one of:
  whether different SRS resources can have different numbers of SRS ports within an SRS resource set; or
  whether different SRS resources can have different numbers of SRS ports across the at least two SRS resource sets.

27. A method for wireless communications by a user equipment (UE), the method comprising:
  signaling, to a network entity, an indication of a capability of the UE to support codebook based or non-codebook based physical uplink shared channel (PUSCH) transmission with at least two sets of repetitions, wherein each set of repetitions is associated with at least one sounding reference signal (SRS) resource set, wherein when the UE indicates the capability of the UE to support non-codebook based PUSCH transmission with at least two sets of repetitions associated with at least two SRS resource sets, the UE also indicates support of one or more associated channel state information reference signals (CSI-RS) resources for calculating a precoder for SRS transmission using measurements of the one or more associated CSI-RS resources;
  receiving, from the network entity, a configuration of at least two SRS resource sets based on the indicated capability;
  transmitting an SRS on SRS resources within each of the at least two SRS resource sets associated with the at least two sets of repetitions;
  receiving, from the network entity, a downlink control information (DCI) scheduling PUSCH repetitions, the DCI indicating one or more SRS resources within the at least two SRS resource sets; and
  transmitting the PUSCH repetitions in the two sets of repetitions based on the SRS resources within the at least two SRS resource sets indicated in the DCI.

28. A method for wireless communications by a network entity, the method comprising:
  receiving an indication of a capability of a user equipment (UE) to support codebook based or non-codebook based physical uplink shared channel (PUSCH) transmission with at least two sets of repetitions, wherein each set of repetitions is associated with at least one sounding reference signal (SRS) resource set, wherein when the network entity receives the indication of the capability of the UE to support non-codebook based PUSCH transmission with at least two sets of repetitions associated with at least two SRS resource sets, the network entity also receives an indication of the UE to support of one or more associated channel state information reference signals (CSI-RS) resources for calculating a precoder for SRS transmission using measurements of the one or more associated CSI-RS resources;
transmitting a configuration of at least two SRS resource sets based on the indicated capability;
receiving an SRS on SRS resources within each of the at least two SRS resource sets associated with the at least two sets of repetitions;
transmitting a downlink control information (DCI) scheduling PUSCH repetitions from the UE, the DCI indicating one or more SRS resources within the at least two SRS resource sets; and
receiving the PUSCH repetitions in the two sets of repetitions based on the SRS resources within the at least two SRS resource sets indicated in the DCI.

* * * * *